(12) United States Patent
Satoh et al.

(10) Patent No.: US 9,210,159 B2
(45) Date of Patent: Dec. 8, 2015

(54) INFORMATION PROCESSING SYSTEM, INFORMATION PROCESSING DEVICE, AND AUTHENTICATION METHOD

(71) Applicants: Jun Satoh, Tokyo (JP); Hiroyuki Matsushima, Kanagawa (JP); Masato Nakajima, Tokyo (JP); Ryo Takemoto, Kanagawa (JP)

(72) Inventors: Jun Satoh, Tokyo (JP); Hiroyuki Matsushima, Kanagawa (JP); Masato Nakajima, Tokyo (JP); Ryo Takemoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/165,713

(22) Filed: Jan. 28, 2014

(65) Prior Publication Data

US 2014/0223532 A1 Aug. 7, 2014

(30) Foreign Application Priority Data

Feb. 6, 2013 (JP) .................................. 2013-021264

(51) Int. Cl.
*H04L 9/00* (2006.01)
*H04L 29/06* (2006.01)

(52) U.S. Cl.
CPC .................................. *H04L 63/0815* (2013.01)

(58) Field of Classification Search
CPC ........................................................ H04L 9/00
See application file for complete search history.

(56) References Cited

U.S. PATENT DOCUMENTS

| | | | | |
|---|---|---|---|---|
| 7,957,990 | B2 * | 6/2011 | Hawkins et al. | 705/29 |
| 2005/0216421 | A1 * | 9/2005 | Barry et al. | 705/64 |
| 2006/0021018 | A1 | 1/2006 | Hinton et al. | |
| 2008/0046984 | A1 * | 2/2008 | Bohmer | H04L 63/0853 726/5 |
| 2009/0077140 | A1 * | 3/2009 | Anglin et al. | 707/204 |
| 2009/0249439 | A1 * | 10/2009 | Olden et al. | 726/1 |
| 2010/0238043 | A1 * | 9/2010 | Wakamiya et al. | 340/691.6 |
| 2011/0246738 | A1 * | 10/2011 | Nakamura et al. | 711/163 |
| 2012/0278872 | A1 * | 11/2012 | Woelfel | H04L 61/2596 726/7 |
| 2013/0019168 | A1 * | 1/2013 | Graham et al. | 715/256 |
| 2013/0298186 | A1 * | 11/2013 | Radkowski | G06F 17/00 726/1 |
| 2014/0022594 | A1 | 1/2014 | Towata | |
| 2014/0337954 | A1 * | 11/2014 | Ahmed | G06F 21/41 726/8 |

FOREIGN PATENT DOCUMENTS

| | | |
|---|---|---|
| JP | 2006-031714 | 2/2006 |
| JP | 2012-226700 | 11/2012 |

\* cited by examiner

*Primary Examiner* — Josnel Jeudy
(74) *Attorney, Agent, or Firm* — IPUSA, PLLC

(57) ABSTRACT

An information processing system includes a receiving unit that receives user identification information and organization identification information from an external device, and an authentication unit that performs authentication of the user identification information and the organization identification information received by the receiving unit using a first storage unit storing one or more sets of user identification information in association with organization identification information. When the authentication unit receives a federated authentication request to access an external service from the external device that is authenticated, the authentication unit sends a federated authentication response to the external device if the organization identification information received from the external device and the external service designated in the federated authentication request are associated with each other in a second storage unit storing the organization identification information in association with information on one or more external services that have established a trust relationship for authentication.

8 Claims, 18 Drawing Sheets

FIG.6

| ORGANIZATION ID | USER NAME | PASSWORD | ADDRESS INFORMATION | ... |
|---|---|---|---|---|
| XXX | User A | AAA | A@aaa.com | |
| XXX | User B | BBB | B@aaa.com | |
| XXX | User C | CCC | C@aaa.com | |
| YYY | User A | AAA | A@bbb.com | |
| YYY | User D | DDD | D@bbb.com | |

FIG.7

| ORGANIZATION ID | DEVICE AUTHENTICATION INFORMATION | OFFICE INFORMATION | CAPABILITY | ... |
|---|---|---|---|---|
| XXX | 111 | OFFICE A | A4 COLOR | |
| XXX | 222 | OFFICE B | A2 COLOR | |
| XXX | 333 | OFFICE B | A4 BLACK & WHITE | |
| YYY | 444 | — | A4 COLOR | |

FIG.8

OOO start.OOO     adm root    Logout    ? FAQ/Inquiry

| Application | Service Management | User Management | Setting |

Set up single sign-on of xxx Apps

Please enter domain name registered with xxx Apps.

Domain name: [ ]

[ OK ] [ Cancel ]

[ Next ]

FIG.9

| OOO start.OOO | | | ⦿ adm root  ⇥ Logout  ? FAQ/Inquiry |
|---|---|---|---|
| Application | Service Management | User Management | Setting |

Set up single sign-on of xxx Apps

Please set up the information below at xxx Apps.

▌URL

Sign-in page : https://www.start.OOO.com/auth/organizations/602474577/saml/redirect/idp Sign-out page : https://www.start.OOO.com/portal/p602474577?portal:componentId=UIPortal&portal:action=Logout Password change page : https://www.start.OOO.com/potral/p602474577/usrinfo

▌Verification certificate

Copy and paste this text in a text file and upload the new text file to verification certificate of xxx Apps.

```
-----BIGIN CERTIFICATE-----
-----(Certificate data)-----
```

| OK | | Return |

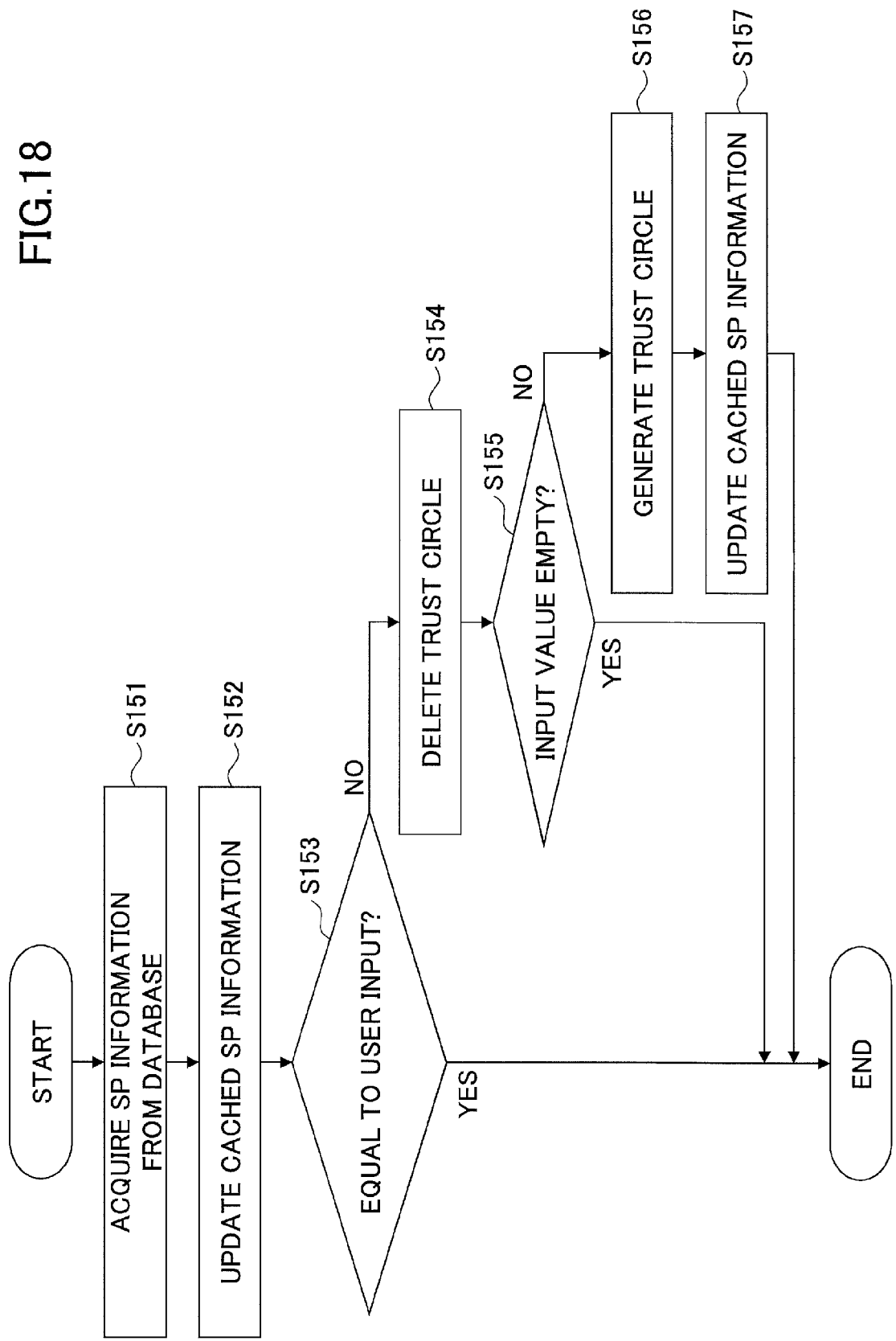

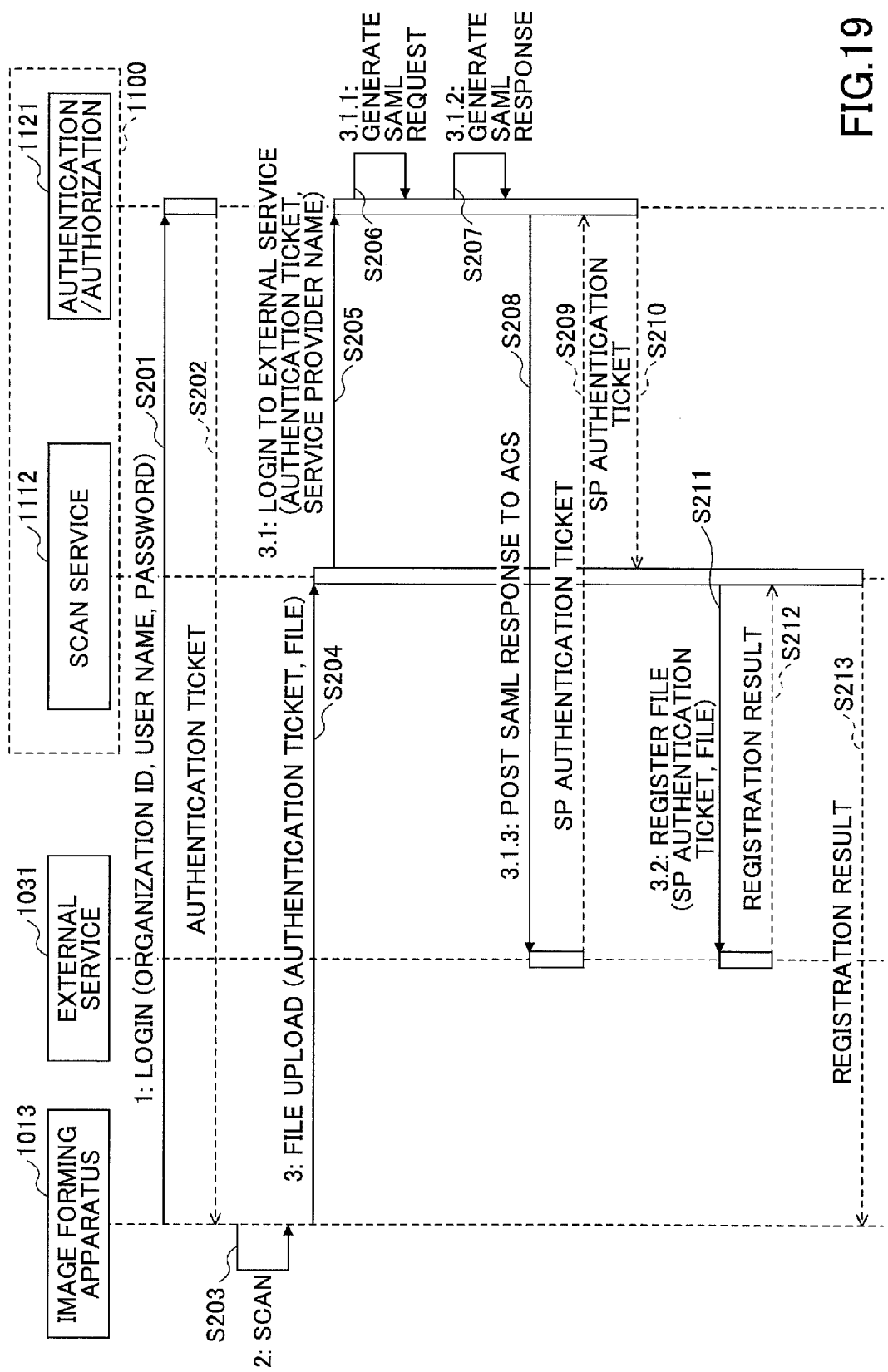

INFORMATION PROCESSING SYSTEM, INFORMATION PROCESSING DEVICE, AND AUTHENTICATION METHOD

BACKGROUND OF THE INVENTION

1. Field of the Invention

The present invention relates to an information processing system, an information processing device, and an authentication method.

2. Description of the Related Art

In recent years, attention has been directed to cloud computing technology, which is a form of providing services from a server to a client. In cloud computing, many computing resources are used for executing data processing, and processing a request from a client. There are many vendors that provide various services by implementing a web service in a cloud computing environment for realizing cloud computing as described above (see e.g., Japanese Laid-Open Patent Publication No. 2012-226700).

The user may need to perform multiple authentication operations in order to use various services provided by cloud computing. Note that Single Sign-On (SSO) is known as a technology for reducing the load on the user when performing authentication. By using Single Sign-On, once the user completes a sign-on (login) operation, i.e., once the user is authenticated, the user does not have to execute another sign-on operation with respect to another service (see e.g., Japanese Laid-Open Patent Publication No. 2006-31714).

The Single Sign-On is an authentication method that involves utilizing a common authentication base for a plurality of services such that once authentication is performed with respect to one service, authentication may be omitted with respect to other services. To implement Single Sign-On, a trust relationship must be established beforehand between an IdP (Identity Provider) that provides authentication/authorization information and a SP (Service Provider) that provides services to a client according to authentication/authorization information issued by the IdP. Such a trust relationship between an IdP and a SP is referred to as "trust circle". A user that is authenticated at the IdP is able to forgo authentication at an SP that has established a trust relationship with the IdP beforehand (i.e., SP that belongs to the same trust circle).

Services of an IdP that are provided by cloud computing may be used by a plurality of organizations. An SP belonging to a trust circle may vary depending on each organization. However, a conventional IdP lacks the means to accommodate such a variation.

Accordingly, there is a demand for a technique for enhancing flexibility in establishing a trust relationship for authentication.

SUMMARY OF THE INVENTION

According to an aspect of the present invention, an information processing system including one or more information processing devices is provided. The information processing system includes a receiving unit configured to receive user identification information and organization identification information from an external device, and an authentication unit configured to perform authentication with respect to the user identification information and the organization identification information received from the external device by the receiving unit using a first storage unit that stores one or more sets of user identification information in association with organization identification information. When the authentication unit receives a federated authentication request to access an external service from the external device that is authenticated, the authentication unit sends a federated authentication response to the external device if the organization identification information received from the external device and the external service designated in the federated authentication request are stored in association with each other in a second storage unit that stores the organization identification information in association with information on one or more external services that have established a trust relationship for authentication.

According to an aspect of the present invention, flexibility may be enhanced in establishing a trust relationship for authentication.

BRIEF DESCRIPTION OF THE DRAWINGS

Other objects, features and advantages of the present invention will become more apparent from the following detailed description when read in conjunction with the accompanying drawings, in which:

FIG. 6 is a configuration diagram of an example of user information;

FIG. 7 is a configuration diagram of an example of device information;

FIG. 8 is an image of an example of a screen for entering a service provider ID;

FIG. 9 is an image of an example of a screen for displaying information to be set up at a service provider;

FIG. 18 is a flowchart illustrating exemplary process steps for caching a service provider URL in a high-speed storage device; and FIG. 19 is a sequence chart illustrating exemplary process steps that may be executed to enable cooperation with an API.

DETAILED DESCRIPTION OF THE PREFERRED EMBODIMENTS

In the following, embodiments of the present invention are described with reference to the accompanying drawings.

First Embodiment

<System Configuration>

Figure 1:
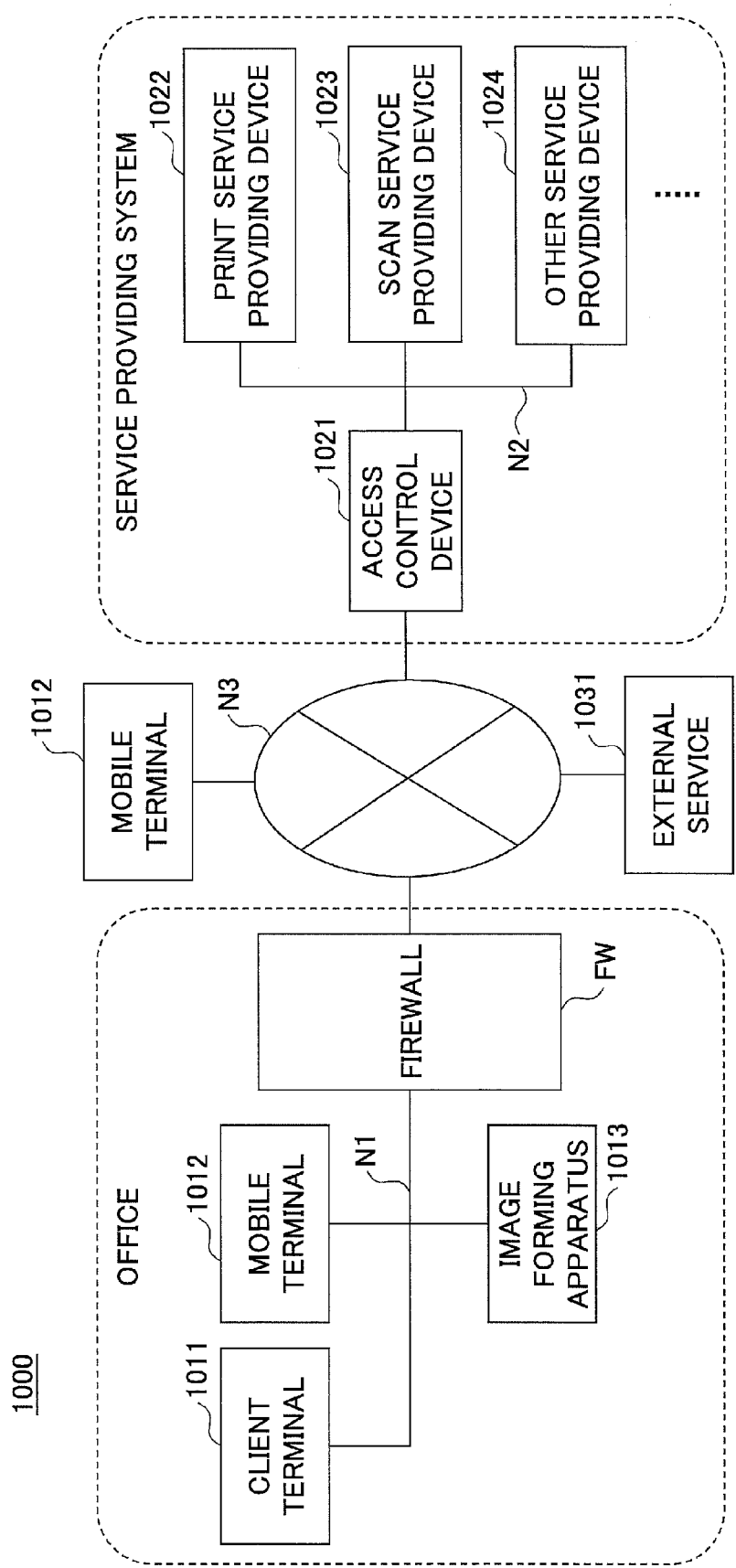
FIG. 1 is a configuration diagram of an example of an information processing system according to a first embodiment.

FIG. 1 is a configuration diagram of an example of an information processing system according to a first embodiment. An information processing system 1000 illustrated in FIG. 1 includes, for example, a network N1 such as a network in an office, a network N2 of a service providing system represented by a cloud service, and a network N3 such as the Internet.

The network N1 is a private network behind a firewall FW. The firewall FW is installed at the contact point between the network N1 and the network N3, and detects and blocks unauthorized access. A client terminal 1011, a mobile terminal 1012, and an image forming apparatus 1013 such as a multifunction peripheral, are connected to the network N1.

The client terminal 1011 is an example of a terminal device. The client terminal 1011 is realized by an information processing device having a typical OS installed therein. The client terminal 1011 includes a unit for performing radio communication or a unit for performing cable communication. The client terminal 1011 is a terminal that can be operated by a user, such as a tablet PC and a notebook PC.

The mobile terminal 1012 is an example of a terminal device. The mobile terminal 1012 includes a unit for performing radio communication or a unit for performing cable communication. The mobile terminal 1012 is a terminal that may be carried by a user, such as a smartphone, a mobile phone, a tablet PC, and a notebook PC.

The image forming apparatus 1013 is a device having an image forming function, such as a multifunction peripheral. The image forming apparatus 1013 includes a unit for performing radio communication or a unit for performing cable communication. The image forming apparatus 1013 is a device for performing processes relevant to image formation, such as a multifunction peripheral, a copier, a scanner, a printer, a laser printer, a projector, and an electronic blackboard. FIG. 1 illustrates an example including one of each of the client terminal 1011, the mobile terminal 1012, and the image forming apparatus 1013; however, there may be a plurality of each of these devices.

The network N2 is connected to the network N3 by an access control device 1021. The security of the network N2 is protected by the access control device 1021. A print service providing device 1022, a scan service providing device 1023, and another service providing device 1024 are connected to the network N2.

In the information processing system 1000 of FIG. 1, the access control device 1021, the print service providing device 1022, the scan service providing device 1023, and the other service providing device 1024 realize a service providing system. The print service providing device 1022, the scan service providing device 1023, and the other service providing device 1024 provide a print service, a scan service, and other services.

The access control device 1021 controls the operation of logging into a print service provided by the print service providing device 1022 or a scan service provided by the scan service providing device 1023, for example.

The access control device 1021, the print service providing device 1022, the scan service providing device 1023, and the other service providing device 1024 are realized by one or more information processing devices.

The access control device 1021, the print service providing device 1022, the scan service providing device 1023, and the other service providing device 1024 may be realized by being integrated in a single information processing device, or may be realized by being distributed across a plurality of information processing devices.

Part of the services on the network N2 side may be outside the network N2. The mobile terminal 1012 may be outside the network N1; namely, outside the office network, for example. In the information processing system 1000 illustrated in FIG. 1, one mobile terminal 1012 is connected to the network N1 and another mobile terminal 1012 is connected to the network N3.

An external service 1031 that is connected to the network N3 may be a device that provides an online storage service, for example. Note that the external service 1031 is an exemplary embodiment of a SP that provides a service to a client according to authentication/authorization information issued by an IdP. The service providing system is an exemplary embodiment of an IdP and a SP.

Figure 2:
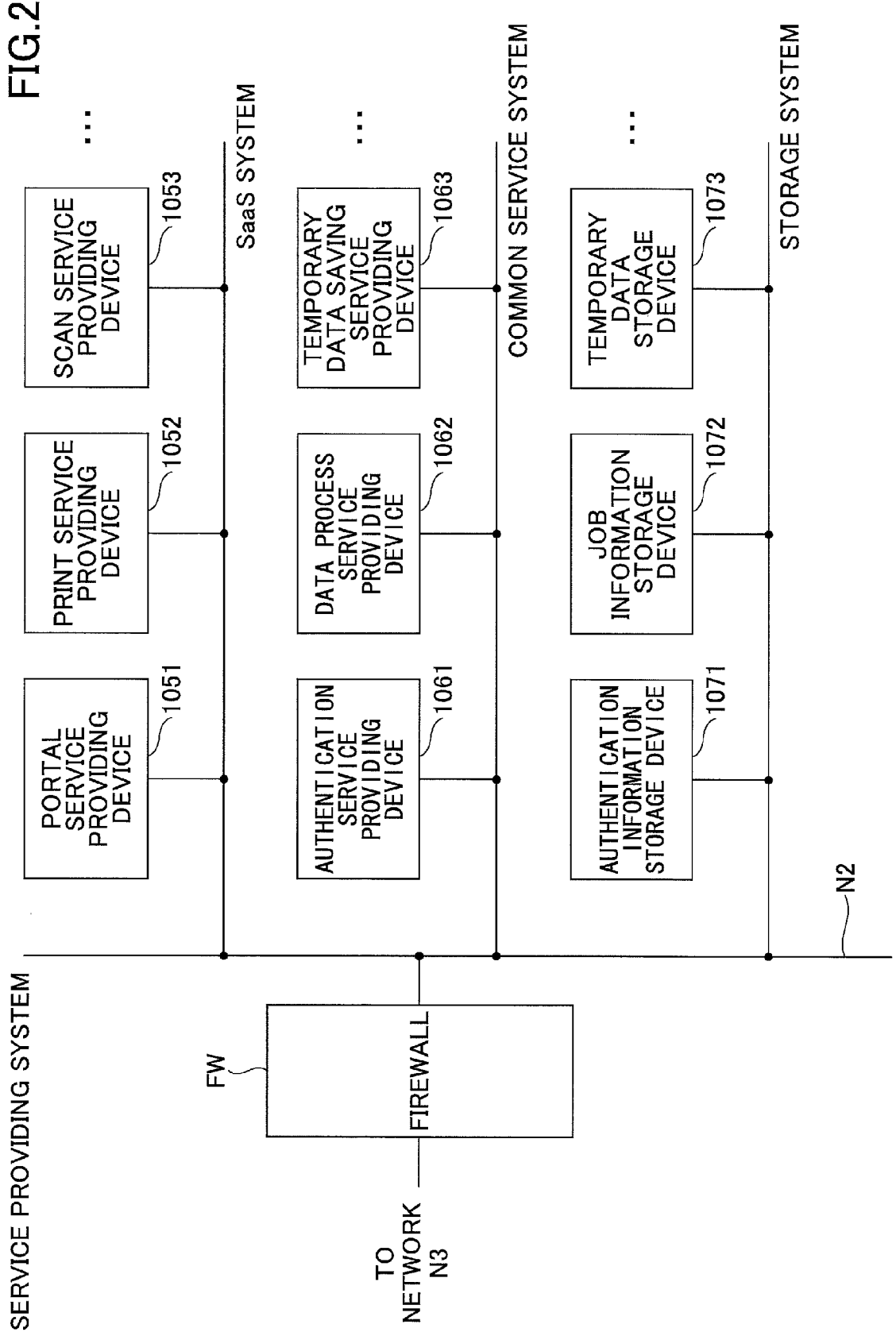
FIG. 2 is a configuration diagram of another example of the service providing system.

The configuration of the service providing system illustrated in FIG. 1 is merely one example; that is, the service providing system may alternatively have a configuration as illustrated in FIG. 2, for example. FIG. 2 is a configuration diagram of another example of the service providing system. In the service providing system of FIG. 2, the network N2 is connected to the network N3 by a firewall FW.

In the network N2, service providing devices of a SaaS (Software as a Service) system, service providing devices of a common service (Network Service Platform) system, and storage devices of a storage system are connected. The service providing device of a common service system provides a service that can be commonly used by the service providing devices of the SaaS system.

The service providing devices of the SaaS system include service providing devices according to the service to be provided, such as a portal service providing device 1051, a print service providing device 1052, and a scan service providing device 1053. Furthermore, the service providing devices of the common service system include service providing devices according to a common service to be provided, such as an authentication service providing device 1061, a data process service providing device 1062, and a temporary data saving service providing device 1063. The storage devices of the storage system include storage devices according to the information (data) to be stored, such as an authentication information storage device 1071, a job information storage device 1072, and a temporary data storage device 1073.

In the service providing system of FIG. 2, security is protected by authentication services provided by, for example, the firewall FW and the authentication service providing device 1061. Note that the configuration of the service providing system of FIG. 2 is also one example, and the service providing system may have other configurations.

<Hardware Configuration>

Figure 3:
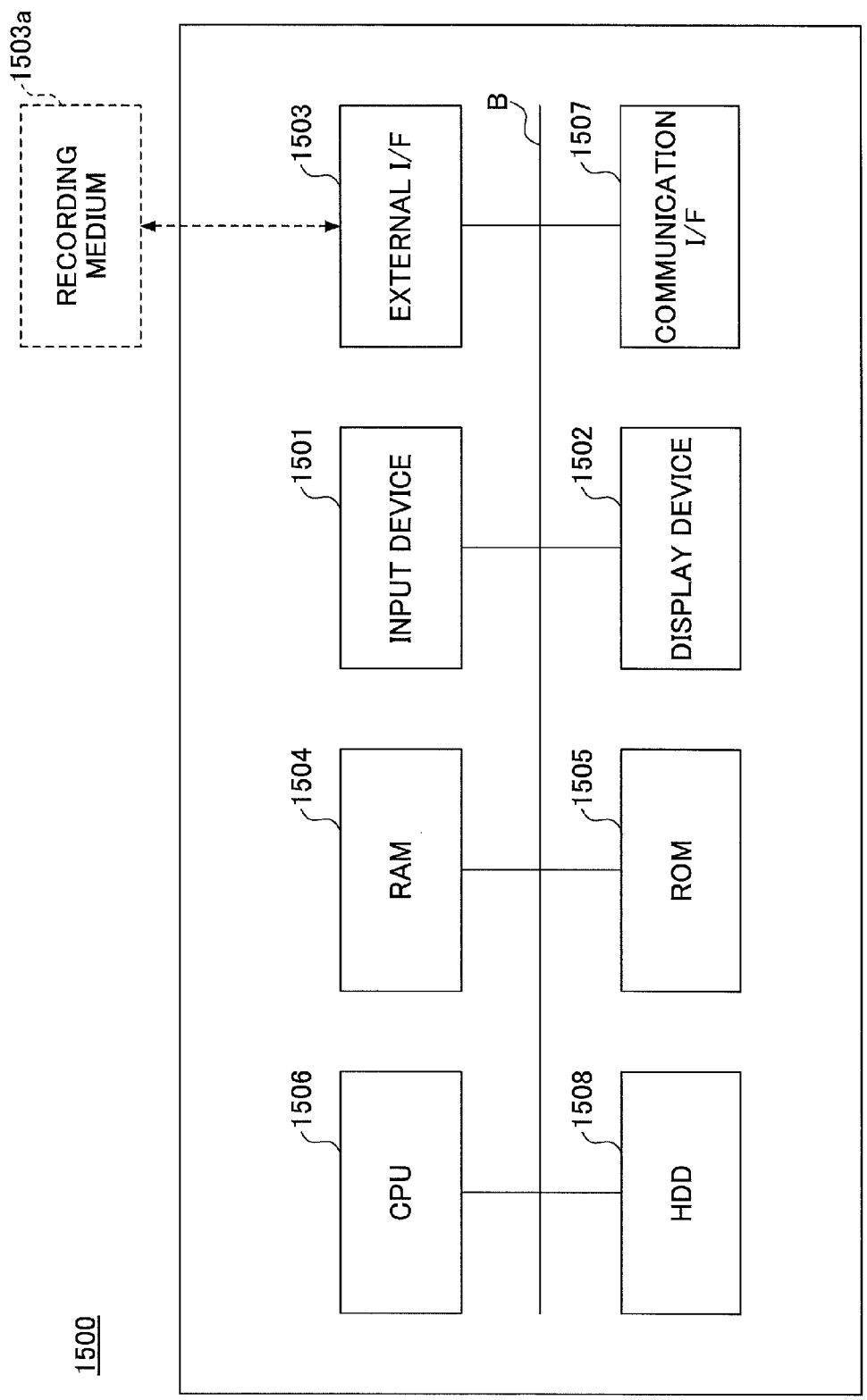
FIG. 3 is a hardware configuration diagram of an example of a computer system.

The client terminal 1011, the mobile terminal 1012, the access control device 1021, the print service providing device 1022, the scan service providing device 1023, and the other service providing device 1024 are realized by, for example, a computer system having a hardware configuration as illustrated in FIG. 3.

The service providing devices of the SaaS system, the service providing devices of the common service system, and the storage devices of the storage system illustrated in FIG. 2 may also be realized by, for example, a computer system having a hardware configuration as illustrated in FIG. 3.

FIG. 3 is a hardware configuration diagram of an example of a computer system. A computer system 1500 illustrated in FIG. 3 includes an input device 1501, a display device 1502, an external I/F 1503, a RAM (Random Access Memory) 1504, a ROM (Read-Only Memory) 1505, a CPU (Central Processing Unit) 1506, a communication I/F 1507, and a HDD (Hard Disk Drive) 1508, which are interconnected by a bus B.

The input device 1501 includes a keyboard, a mouse, and a touch panel, which are used by the user for inputting operation signals. The display device 1502 includes a display, etc., and displays processing results obtained by the computer system 1500.

The communication I/F 1507 is an interface for connecting the computer system 1500 to the networks N1 through N3. Accordingly, the computer system 1500 can perform data communication via the communication I/F 1507.

The HDD 1508 is a nonvolatile storage device storing programs and data. Examples of the stored programs and data are an OS (Operating System) which is the basic software for controlling the entire computer system 1500, and application software for providing various functions in the OS.

The HDD 1508 manages the stored programs and data by a predetermined file system and/or a DB (database). The external I/F 1503 is an interface between the computer system 1500 and an external device. An example of the external device is a recording medium 1503a. Accordingly, the computer system 1500 can read data from and/or write data in the recording medium 1503a via the external I/F 1503. Examples of the recording medium 1503a are a flexible disk, a CD (Compact Disk), a DVD (Digital Versatile Disk), an SD memory card, and a USB memory (Universal Serial Bus memory).

The ROM 1505 is a nonvolatile semiconductor memory (storage device) that can hold programs and data even after the power is turned off. The ROM 1505 stores programs and data such as BIOS (Basic Input/Output System) that is executed when the computer system 1500 is activated, OS settings, and network settings. The RAM 1504 is a volatile semiconductor memory (storage device) for temporarily storing programs and data The CPU 1506 is a processor that controls and executes overall operations and functions of the computer system 1500 by loading programs and data from storage devices such as the ROM 1505 and the HDD 1508 into the RAM 1504 and executing relevant processes, for example.

The client terminal 1011, the mobile terminal 1012, the access control device 1021, the print service providing device 1022, the scan service providing device 1023, and the other service providing device 1024 can realize various processes as described below, by the hardware configuration of the computer system 1500. Furthermore, the service providing device of the SaaS system, the service providing device of the common service system, and the storage device of the storage system can also realize various processes as described below, by the hardware configuration of the computer system 1500. Note that descriptions of hardware configurations of the image forming apparatus 1013 and the firewall FW illustrated in FIG. 1 are omitted.

<Software Configuration>
<<Service Providing System>>

Figure 4:
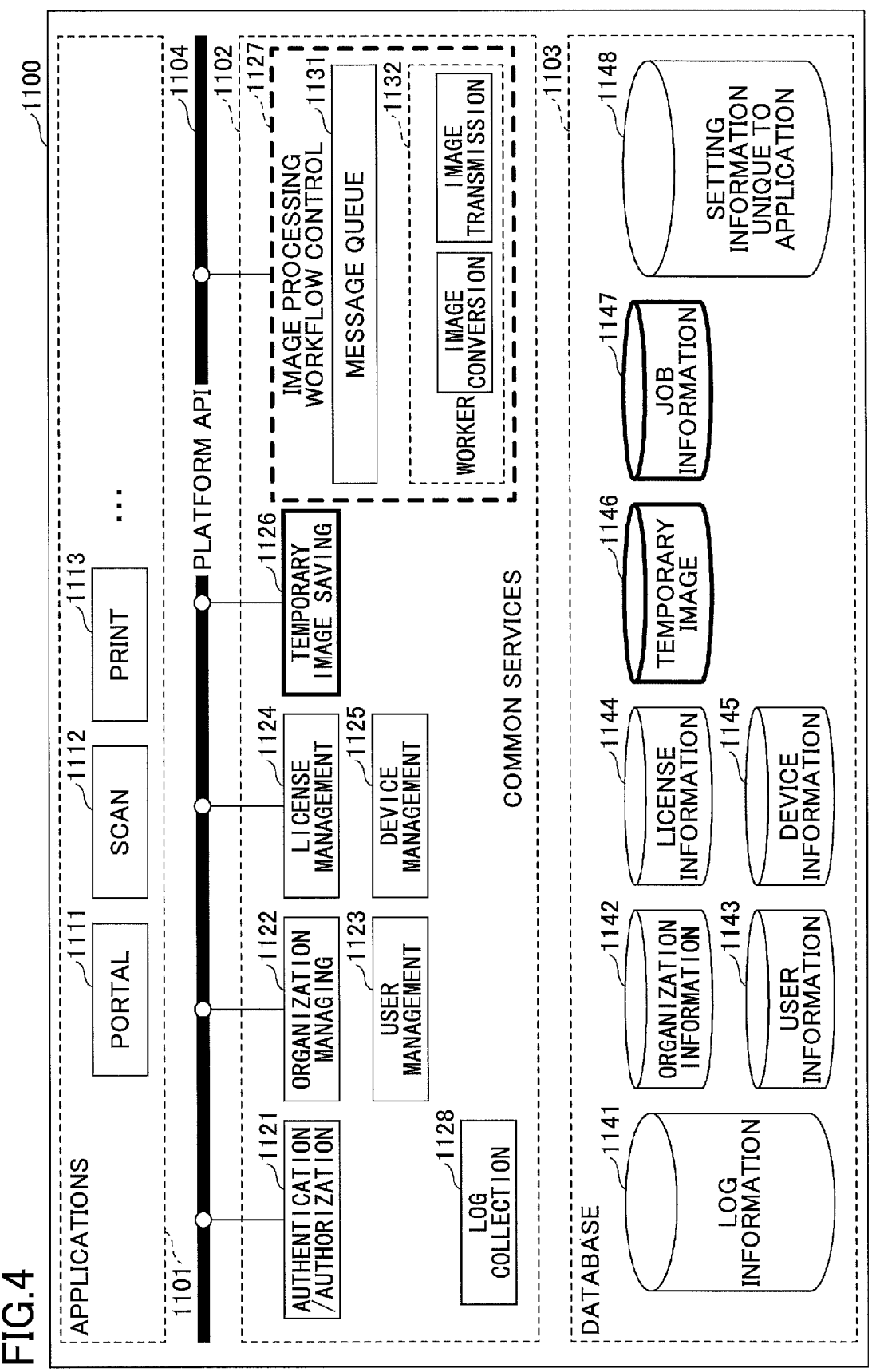
FIG. 4 is a process block diagram of an example of a service providing system according to the first embodiment.

The service providing system according to the first embodiment is realized by, for example, process blocks as illustrated in FIG. 4. FIG. 4 is a process block diagram of an example of a service providing system according to the first embodiment.

A service providing system 1100 realizes applications 1101, common services 1102, a database (DB) 1103, and a platform API (Application Programming Interface) 1104, by executing programs.

The applications 1101 include, for example, a portal service application 1111, a scan service application 1112, and a print service application 1113.

The portal service application 1111 is an application for providing a portal service. A portal service provides a service acting as an entrance for using the service providing system 1100. The scan service application 1112 is an application for providing a scan service. The print service application 1113 is an application for providing a print application. The applications 1101 may include other service applications.

The platform API 1104 is an interface for using the common services 1102 by the applications 1101, by the portal service application 1111, the scan service application 1112, and the print service application 1113. The platform API 1104 is an interface that is defined in advance, which is provided for the common services 1102 to receive requests from the applications 1101. The platform API 1104 may include functions and classes, for example.

The platform API 1104 may be realized by, for example, a Web API that can be used via the network, in a case where the service providing system 1100 includes a plurality of information processing devices.

The common services 1102 include an authentication/authorization unit 1121, an organization managing unit 1122, a user management unit 1123, a license management unit 1124, a device management unit 1125, a temporary image saving unit 1126, an image processing workflow control unit 1127, and a log collection unit 1128.

Furthermore, the image processing workflow control unit 1127 includes a message queue 1131, and at least one worker 1132. The worker 1132 realizes functions such as image conversion and image transmission.

The authentication/authorization unit 1121 executes authentication/authorization based on a login request from office devices such as the client terminal 1011 and the image forming apparatus 1013. The term "office device" is used below as a generic term for devices used at the office such as the client terminal 1011, the mobile terminal 1012, and the image forming apparatus 1013.

The authentication/authorization unit 1121 authenticates/authorizes a user by accessing, for example, a user information storage unit 1143 and a license information storage unit 1144, which are described below. Furthermore, the authentication/authorization unit 1121 authenticates, for example, the image forming apparatus 1013 by accessing, for example, the organization information storage unit 1142, the license information storage unit 1144, and the device information storage unit 1145, described below.

The organization managing unit 1122 manages organization information stored in an organization information storage unit 1142 described below. The user management unit 1123 manages user information stored in the user information storage unit 1143 described below.

The license management unit 1124 manages license information stored in the license information storage unit 1144 described below. The device management unit 1125 manages device information stored in a device information storage unit 1145 described below. The temporary image saving unit 1126 saves temporary images in a temporary image storage unit 1146 described below, and acquires temporary images from the temporary image storage unit 1146.

The image processing workflow control unit 1127 controls a workflow relevant to image processing, based on a request from the applications 1101. The message queue 1131 includes a queue corresponding to the type of process. The image processing workflow control unit 1127 submits the message of the request relevant to the process (job), in the queue corresponding to the type of the job.

The worker 1132 monitors the corresponding queue. When a message is submitted in the queue, the worker 1132 performs a process such as image conversion and image transmission according to the type of the corresponding job. Note that the submitted message may be subjectively read (pulled) by the worker 1132, or may be provided (pushed) from the queue to the worker 1132.

The database 1103 includes a log information storage unit 1141, an organization information storage unit 1142, a user information storage unit 1143, a license information storage unit 1144, a device information storage unit 1145, a temporary image storage unit 1146, a job information storage unit 1147, and an application-specific setting information storage unit 1148.

The log information storage unit 1141 stores log information. The organization information storage unit 1142 stores organization information described below. The user information storage unit 1143 stores user information described below. The license information storage unit 1144 stores license information described below. The device information storage unit 1145 stores device information described below.

The temporary image storage unit 1146 stores a temporary image. A temporary image is, for example, a file or data of a scan image to be processed by the worker 1132. The job information storage unit 1147 stores information (job information) of a request relevant to a process (job). The application-specific setting information storage unit 1148 stores setting information unique to the application 1101.

The service providing system 1100 functions as an integrated base for providing a common service such as a workflow relevant to authentication/authorization and image processing, and a group of services providing application services by using the function of the integrated base, such as a scan service, a print service, and a portal service. The integrated base is constituted by, for example, the common services 1102, the database 1103, and the platform API 1104. The group of services is constituted by, for example, the applications 1101.

The service providing system 1100 illustrated in FIG. 4 can easily develop the applications 1101 using the platform API 1104, according to the configuration in which the group of services and the integrated base are separated.

Note that the classification form of the process blocks of the service providing system 1100 illustrated in FIG. 4 is one example; that is, the applications 1101, the common services 1102, and the database 1103 do not necessarily have to be classified into a hierarchy as illustrated in FIG. 4. As long as the process of the service providing system 1100 according to the first embodiment can be performed, the hierarchical relationship illustrated in FIG. 4 is not limited to a particular relationship.

Figure 5:
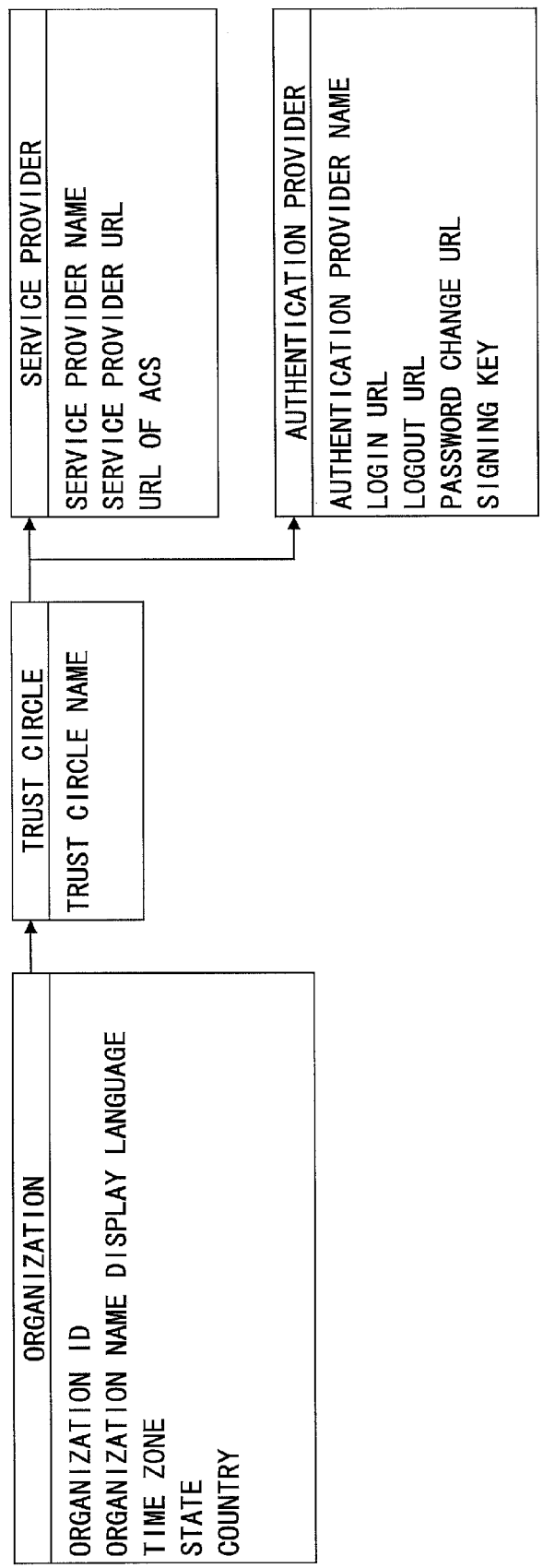
FIG. 5 is a data configuration diagram of an example of organization information.

FIG. 5 is a configuration diagram of an example of organization information. The organization information illustrated in FIG. 5 includes information on an organization, a trust circle, a SP, and an IdP that are associated with each other. The information on the organization includes, as information items, an organization ID, an organization name display language, a time zone, a state, and a country, for example. The information on the trust circle includes, as an information item, a trust circle name, for example. The information on the service provider (SP) includes, as information items, a service provider name, a service provider URL, and an ACS (Assertion Consumer Service) URL, for example. The ACS URL corresponds to a POST destination for a SAML (Secure Assertion Markup Language) response as described below. Also, the information on the IdP included in the organization information illustrated in FIG. 5 includes, as information items, an authentication provider name, a login URL, a logout URL, a password change URL, and a signing key, for example.

The organization ID is information for identifying a group such as a company and a department. The organization ID is not limited to information specifically identifying the organization itself but may be in other forms such as information identifying a subscription, for example. Note that the organization ID is unique.

The organization name display language indicates the language used for expressing the name of a group such as a company and a department. The time zone indicates the standard time used by a group such as a company and a department. A state indicates the state or status of a group such as a company and a department. A country indicates the country of a group such as a company and a department.

As described below, single sign-on setting information is configured to have the data structure of the organization information as illustrated in FIG. 5. By configuring the organization information as illustrated in FIG. 5, the service providing system 1100 may set up a trust circle associated with an organization and implement SAML-based single sign-on that can accommodate a plurality of organizations.

FIG. 6 is a configuration diagram of an example of user information. The user information illustrated in FIG. 6 includes, as information items, an organization ID, a user name, a password, and address information. The user name and the password are information for identifying a user. The user name may be a user ID, for example. The password is not essential and may be omitted. Note that a user name and a password managed under the same organization ID are unique but they may overlap with another user name or a password managed under a different organization ID. The address information may be an email address of a user, for example.

Further, as the user name, information for identifying an electronic medium (e.g., IC card) owned by the user may be used. Examples of an electronic medium owned by the user include an IC card, a mobile phone, a tablet terminal, and an electronic book terminal, for example. As the information for identifying the electronic medium, a card ID, a serial ID, a telephone number of a mobile phone, profile information of a terminal, or a combination of the above may be used, for example.

FIG. 7 is a configuration diagram of an example of device information. The device information illustrated in FIG. 7 includes, as information items, an organization ID, device authentication information, office information, and capability. The device authentication information is information used for device authentication, which is performed for determining whether an office device fulfills a particular condition. The device authentication information may be an ID indicating that a particular application is installed in the office device, or a device number indicating a particular office device. The office information indicates, for example, the office at which the office device is installed. The capability indicates, for example, the capability of the office device.

<Processes>

<<Single Sign-On Setting>>

In the case of implementing single sign-on between the service providing system 1100 and a service provider such as the external service 1031, an administrator has to establish a trust relationship between the service providing system 1100 and the service provider beforehand. For example, to implement single sign-on, the administrator may perform a single sign-on setting operation on the service providing system 1100, and perform a single sign-on setting operation on the external service 1031.

First, to perform the single sign-on setting operation on the service providing system 1100, an ID of the service provider such as the external service 1031 has to be entered. FIG. 8 is an image of an exemplary screen for entering an ID of a service provider. For example, the administrator may enter a domain name registered with the external service 1031 into the screen illustrated in FIG. 8 as the ID (e.g., domain name, URL) of the service provider that is to use single sign-on. The domain name of the external service 1031 entered into the screen of FIG. 8 assumes a function similar to that of the organization ID of the service providing system 1100 at the external service 1031 side.

The portal service application 1111 displays a screen as illustrated in FIG. 9, for example, to indicate information to be set up at the service provider. FIG. 9 is an image of an exemplary screen displaying information to be set up at the service provider. Information to be set up at the service provider may include a login URL (sign-in page URL), a logout URL (sign-out page URL), a password change URL, and a public key certificate for signature validation (verification certificate), for example.

Note that the login URL (sign-in page URL) in FIG. 9 corresponds to a redirect URL for deploying SAML federation as described below. The administrator displays an administrator page of the external service 1031 and performs a single sign-on setting operation on the external service 1031. The administrator refers to the information to be set up at the service provider displayed in the screen of FIG. 9 and enters the information in the administrator page of the external service 1031 to set up the external service 1031 for single sign-on.

By performing single sign-on setup of the external service 1031 at the administrator page of the external service 1031 as described above, the administrator may establish a trust relationship between the service providing system 1100 and the external service 1031.

By performing single sign-on setting operations on the service providing system 1100 and the external service 1031 as described above, the portal service application 1111 may add the external service 1031 to the trust circle as a service provider belonging to the trust circle.

<<Screen Transitions>>

Figure 10:
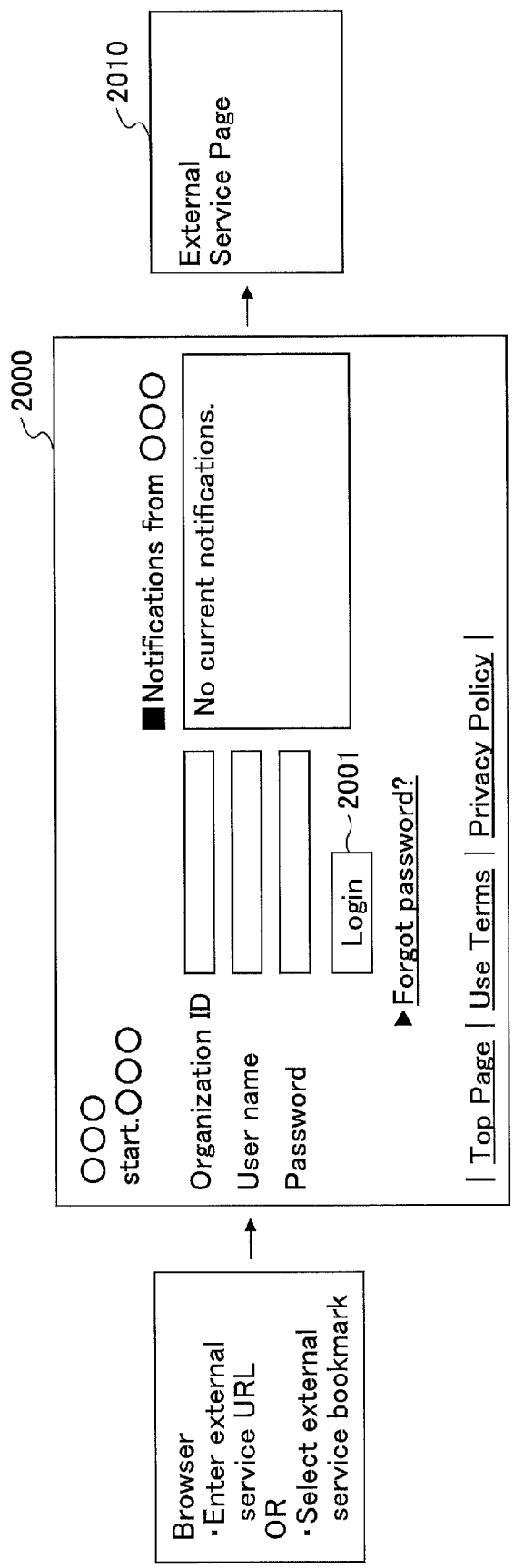
FIG. 10 is a diagram illustrating an exemplary screen transition.

When the URL of the external service 1031 is entered or a bookmark for the external service 1031 is selected at a browser installed in one of the office devices illustrated in FIG. 1, the browser may access the external service 1031 through a screen transition as illustrated in FIG. 10, for example. Note that FIG. 10 illustrates a case where the browser is accessing the service provider 1031 that has already been set up for single sign-on.

FIG. 10 illustrates an exemplary screen transition. In FIG. 10, when the URL of the external service 1031 is entered or a bookmark for the external service 1031 is selected as the access destination, for example, the browser installed in the office device of FIG. 1 is redirected to a login screen 2000 of the portal service application 1111.

By successfully logging in via the login screen 2000 of the portal service application 1111, the browser of the office device of FIG. 1 may be redirected to a page 2010 of the external service 1031.

Figure 11:
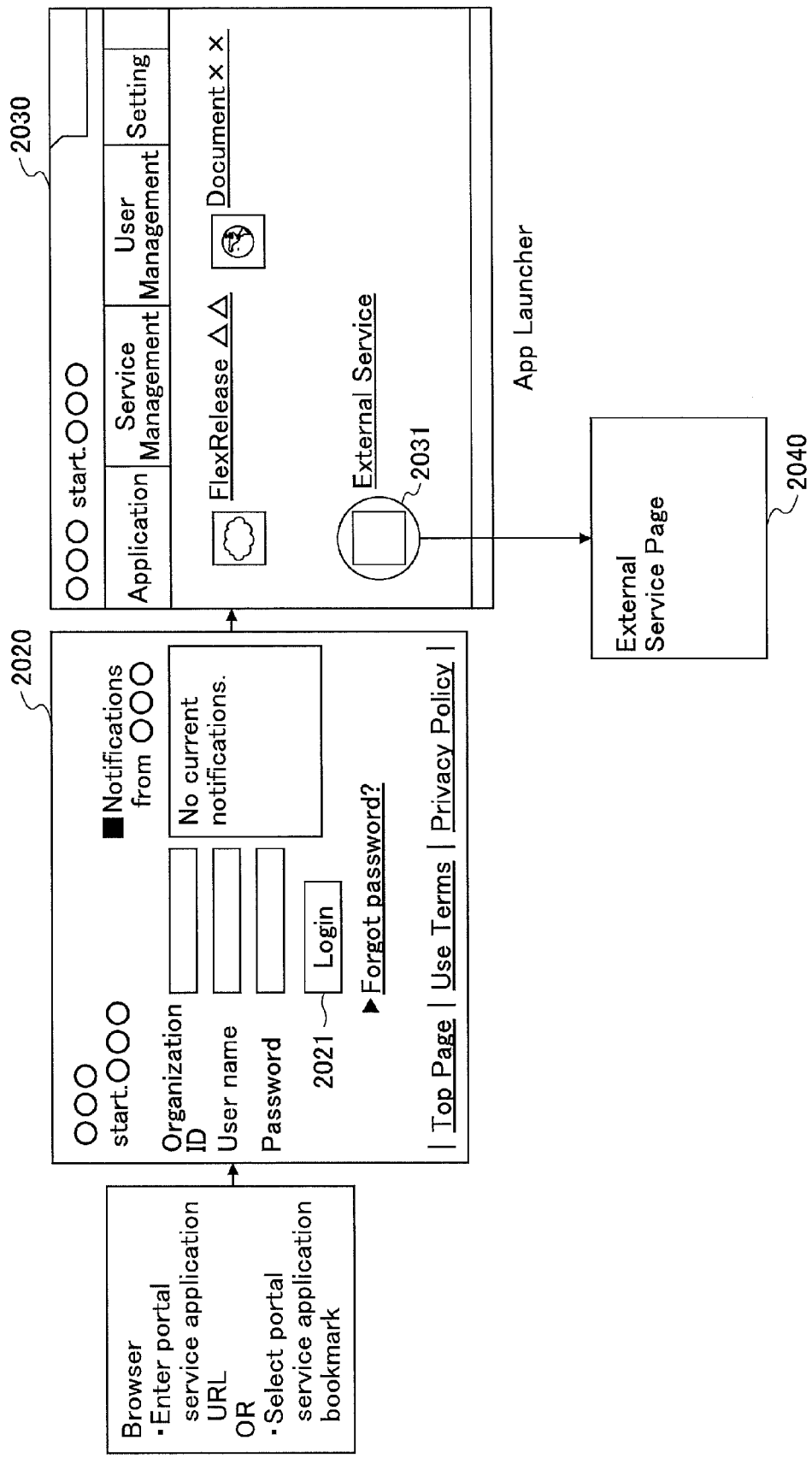
FIG. 11 a diagram illustrating another exemplary screen transition.

In another example, when the URL of the portal service application 1111 is entered or a bookmark for the portal service application 1111 is selected at the browser installed in the office device of FIG. 1, the browser may access the external service 1031 via a screen transition as illustrated in FIG. 11. Note that FIG. 11 illustrates a case where the browser is accessing the service provider 1031 that has already been set up for single sign-on.

FIG. 11 illustrates another exemplary screen transition. In FIG. 11, when the URL of the portal service application 1111 is entered or a bookmark for the portal service application 1111 is selected as the access destination, for example, the browser installed in the office device of FIG. 1 is redirected to a login screen 2020 of the portal service application 1111.

By successfully logging in via the login screen 2020 of the portal service application 1111, the browser of the office device of FIG. 1 may display an app launcher screen 2030. In turn, a user may click an icon 2031 for the external service 1031 displayed at the app launcher screen 2030, for example.

Because the user has already successfully logged in via the login screen 2020, the browser installed in the office device of FIG. 1 is not redirected to the login screen 2020 and is redirected to a page 2040 of the external service 1031.

As can be appreciated from the above, a screen transition upon accessing the external service 1031 may vary depending on whether the user has already logged into the portal service application 1111. In the following, process steps of the information processing system 1000 for prompting the screen transitions as illustrated in FIGS. 10 and 11 are described.

<<Process Steps for Prompting Screen Transition of FIG. 10>>

Figure 12:
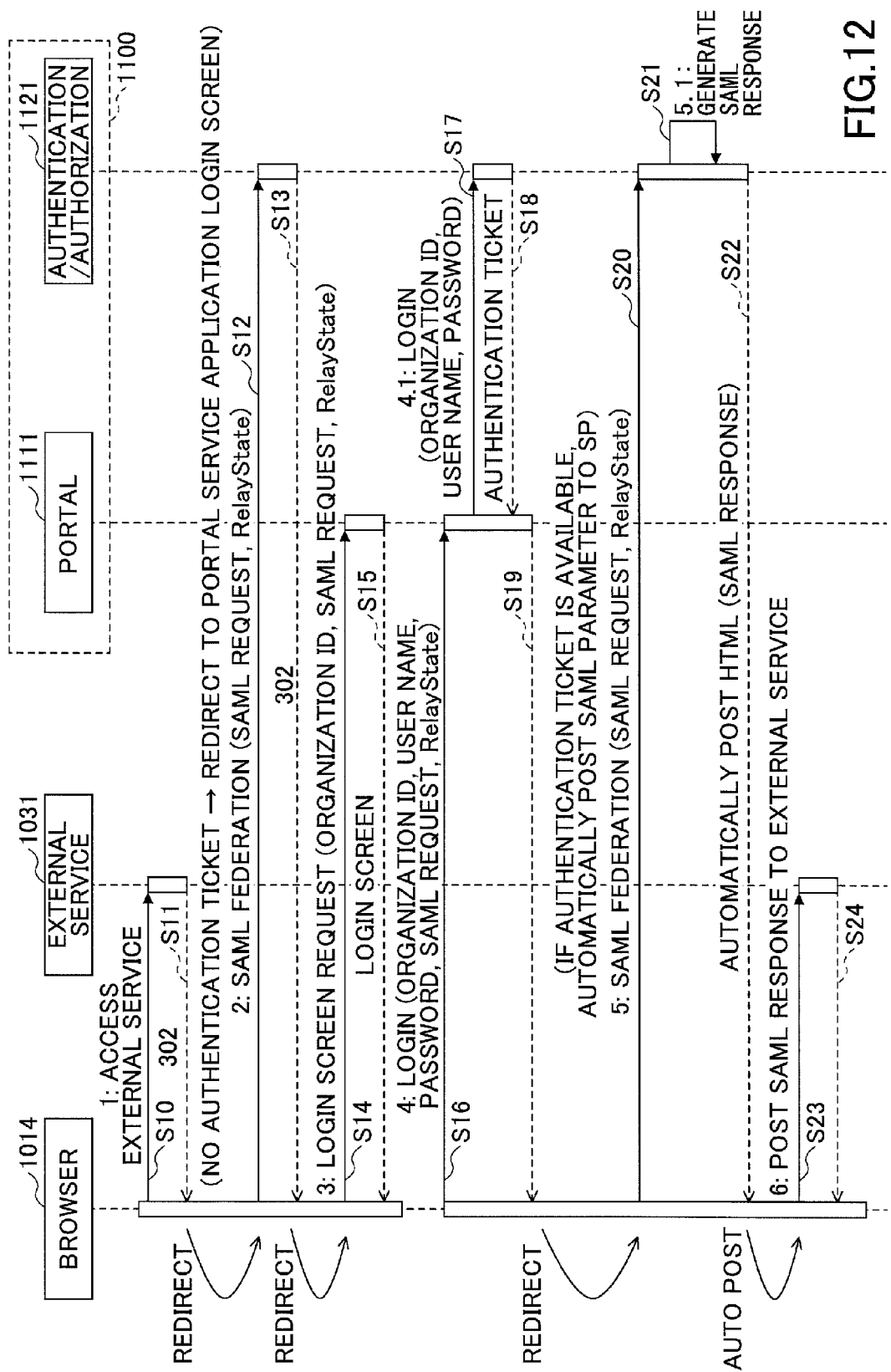
FIG. 12 is a sequence chart illustrating an example of process steps for accessing an external service that is set up for single sign-on from a browser.

FIG. 12 is a sequence chart illustrating exemplary process steps for accessing the external service 1031 that is already set up for single sign-on from a browser 1014.

In step S10, when a user enters the URL of the external service 1031 or selects a bookmark for the external service 1031 as an access destination at the browser 1014 installed in the office device of FIG. 1, the browser 1014 accesses the external service 1031.

In steps S11 and S12, the browser 1014 is redirected to the URL that is set up as the login URL (sign-in page URL) by the single sign-on setting. Upon being redirected to the login URL, the browser 1014 sends a SAML federation request to the authentication/authorization unit 1121. The SAML federation request includes a SAML request and a RelayState. RelayState is a component of the SAML standard specification and refers to state information of the external service corresponding to the destination of a SAML response. After executing the process of step S12, the authentication/authorization unit 1121 may execute process steps as illustrated in FIG. 13, for example.

Figure 13:
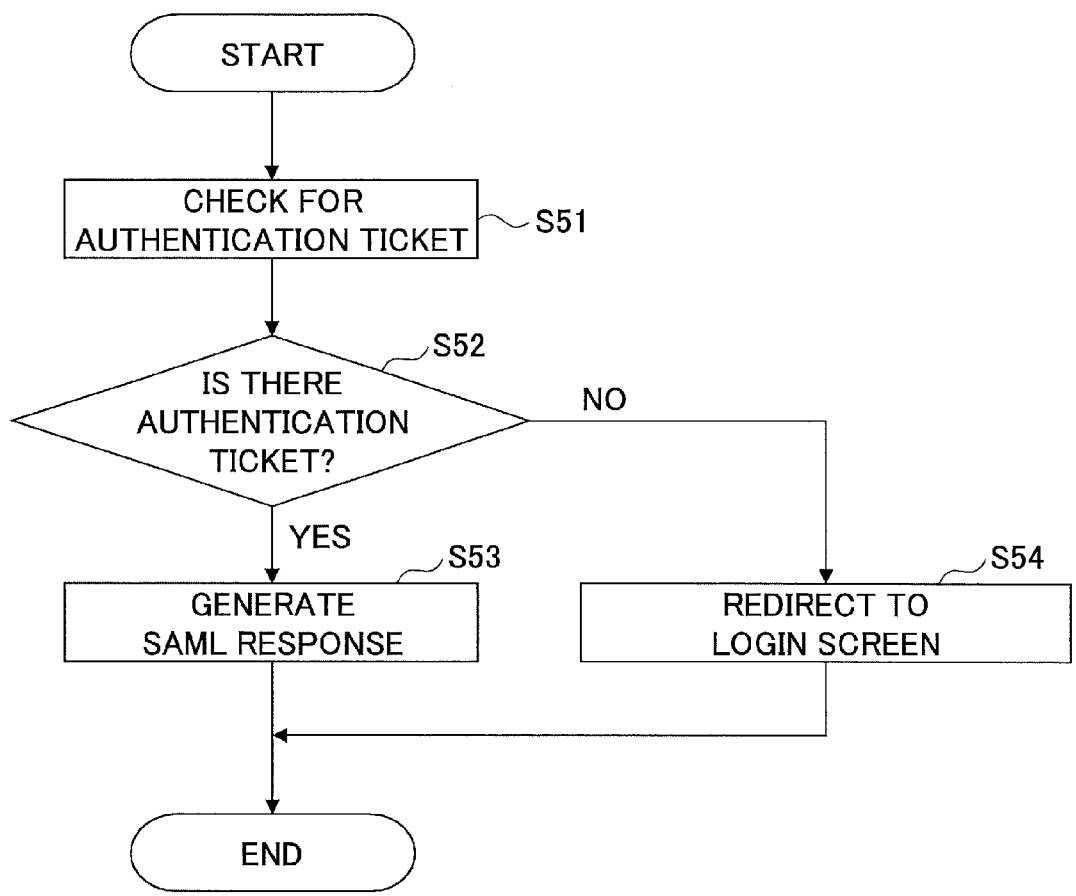
FIG. 13 is a flowchart illustrating exemplary process steps that may be executed by an authentication/authorization part.

FIG. 13 is a flowchart illustrating exemplary process steps that may be executed by the authentication/authorization unit 1121. In step S51, the authentication/authorization unit 1121 checks whether an authentication ticket is included in the SAML federation request. In step S52, if the authentication/authorization unit 1121 determines that an authentication ticket is included, the process proceeds to step S53, and the authentication/authorization unit 1121 generates a SAML response. On the other hand, if the authentication/authorization unit 1121 determines in step S52 that an authentication ticket is not included, the process proceeds to step S54 where the authentication/authorization unit 1121 prompts the browser 1014 to be redirected to the login screen of the portal service application 1111.

Note that the URL of the login screen of the portal service application 1111 to which the browser 1014 is redirected in step S54 may be stored at the authentication/authorization unit 1121, for example. In the following, an exemplary case where the browser 1014 is redirected to the login screen of the portal service application 1111 is described.

In steps S13 and S14 of FIG. 12, the browser 1014 is redirected to the login screen of the portal service application 1111, and in turn, the browser 1014 sends a request for the login screen to the portal service application 1111. Note that the login screen request includes an organization ID, a SAML request, and a RelayState.

In step S15, the portal service application 1111 sends a login screen having the SAML request and the RelayState embedded as hidden type input tags in an HTML form. In this way, the browser 1014 may display the login screen 2000 as illustrated in FIG. 10, for example.

The user may then enter an organization ID, a user name, and a password into the login screen 2000 and press a login button 2001. Note that in a case where the organization ID included in the login screen request is to be used, the user may not have to enter the organization ID into the login screen 2000. When the login button 2001 is pressed, the browser 1014 proceeds to step S16 where it sends a login request to the portal service application 1111. Note that the login request includes an organization ID, a user name, a password, a SAML request, and a RelayState.

In step S17, the portal service application 1111 sends a login request including the organization ID, the user name, and the password included in the login request from the browser 1014 to the authentication/authorization unit 1121. The authentication/authorization unit 1121 determines whether the combination of the organization ID, the user name, and the password included in the login request from the portal service application 1111 is stored as user information in the user information storage unit 1143 as illustrated in FIG. 6.

If the combination of the organization ID, the user name, and the password is included in the user information storage unit 1143, in step S18, the authentication/authorization unit 1121 returns an authentication ticket to the portal service application 1111. After receiving the authentication ticket in step S18, the portal service application 1111 may execute process steps as illustrated in FIG. 14, for example.

Figure 14:
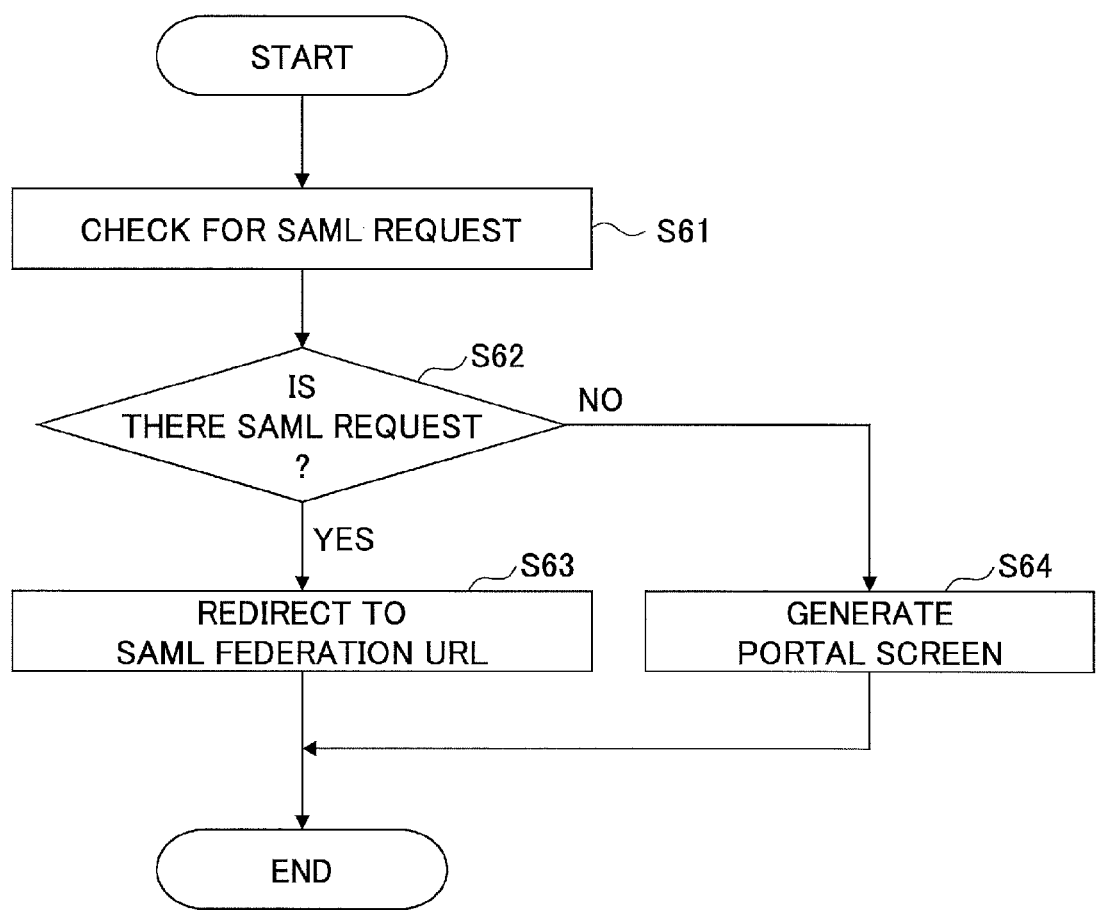
FIG. 14 is a flowchart illustrating exemplary process steps that may be executed by a portal service application.

FIG. 14 is a flowchart illustrating process steps that may be executed by the portal service application 1111. In step S61, the portal service application 1111 checks whether a SAML request is included in the login request received in step S16. In step S62, if the portal service application 1111 determines that a SAML request is included, the process proceeds to step S63 where the portal service application 1111 prompts the browser 1014 to be redirected to a sign-in page URL (SAML federation URL). If the portal service application 1111 determines that SAML request is not included, the process proceeds to step S64 where the portal service application 1111 generates a portal screen.

In the following, an exemplary case where the browser 1014 is redirected to the sign-in page URL (SAML federation URL) is described. In steps S19 and S20 of FIG. 12, the browser 1014 is redirected to the SAML federation URL, and in turn, the browser 1014 sends a SAML federation request to the authentication/authorization unit 1121. Note that the SAML federation request of step S20 includes a SAML request, a RelayState, and an authentication ticket.

After the process of step S20 is executed, the authentication/authorization unit 1121 executes the process steps illustrated in FIG. 13 as described above. Because an authentication ticket is included in the SAML federation request of step S20, the authentication/authorization unit 1121 generates an SAML response in step S53. Note that in step S53 the authentication/authorization unit 1121 generates a SAML response to a SAML request from the external service 1031 that belongs to the same trust circle associated with the same organization.

In the following, an exemplary case in which an SAML response is generated at the authentication/authorization unit 1121 is described. In step S21 of FIG. 12, the authentication/authorization unit 1121 generates the SAML response. In steps S22 and S23, the authentication/authorization unit 1121 designates a POST destination of the external service to which the SAML response is to be posted and prompts the browser 1014 to automatically POST the SAML response. In step S24, the external service 1031 checks the SAML response and prompts the browser 1014 to display a service screen for the corresponding user.

By implementing the process steps as illustrated in FIG. 12, a SAML response may be generated with respect to a SAML request from the external service 1031 belonging to the same trust circle associated with the same organization. That is, in the information processing system 1000 according to the first embodiment, a trust circle may be set up with respect to each organization, and in this way, SAML-based single sign-on accommodating a plurality of organizations may be implemented. As a result, flexibility may be enhanced in establishing a trust relationship for authentication in the information processing system 1000 according to the first embodiment.

Also, by implementing the process steps as illustrated in FIG. 12, when login via the login screen of the portal service application 1111 has not yet been performed, the browser 1014 may be prompted to display the login screen in response to a SAML federation request.

Also, by implementing the process steps as illustrated in FIG. 12, a determination may be made as to whether a login request from the browser 1014 corresponds to a SAML request or a normal login request, and a SAML response may be returned in the case where the login request corresponds to a SAML request.

<<Process Steps for Prompting Screen Transition of FIG. 11>>

Figure 15:
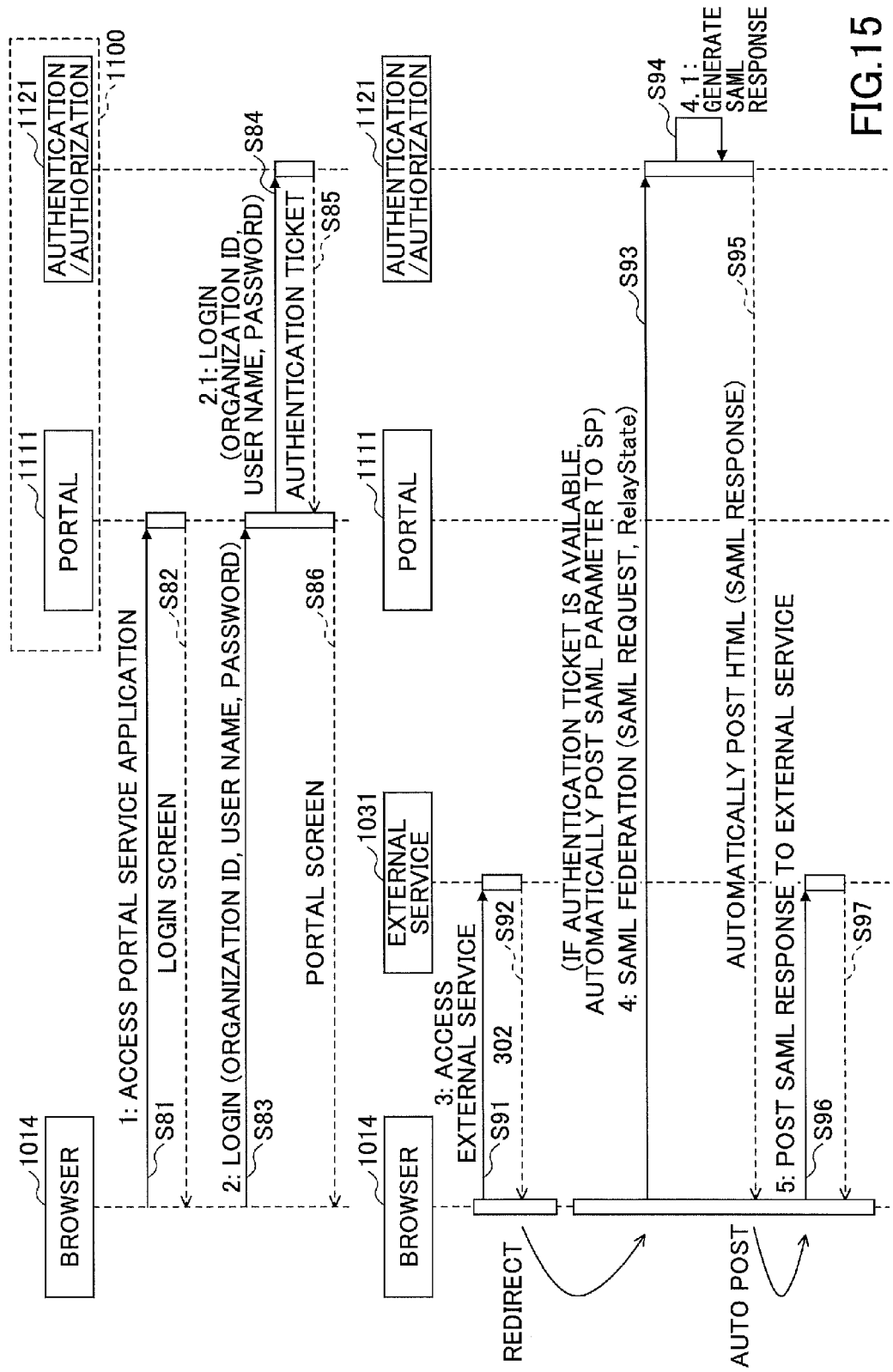
FIG. 15 is a sequence chart illustrating another example of process steps for accessing an external service that is set up for single sign-on from a browser.

FIG. 15 is a sequence chart illustrating another example of process steps for accessing the external service 1031 that is already set up for single sign-on from the browser 1014.

In step S81, when a user enters the URL of the portal service application 1111 or selects a bookmark for the portal service application 1111 as the access destination at the browser 1014 installed in the office device of FIG. 1, the browser 1014 accesses the portal service application 1111.

In step S82, the portal service application 1111 sends a login screen to the browser 1014. In turn, the browser 1014 displays the login screen 2020 as illustrated in FIG. 11. Note that the URL of the login screen 2020 illustrated in FIG. 11 is different from the URL of the login screen 2000 illustrated in FIG. 10.

The user enters an organization ID, a user name, and a password into the login screen 2020 and presses a login button 2021. Note that in a case where a pre-designated organization ID is to be used, the user may not have to enter the organization ID in the login screen 2020. When the login button 2021 is pressed, the browser 1014 proceeds to step S83 and sends a login request to the portal service application 1111. The login request sent in step S83 includes an organization ID, a user name, and a password.

In step S84, the portal service application 1111 sends a login request including the organization ID, the user name, and the password included in the login request from the browser 1014 to the authentication/authorization unit 1121. The authentication/authorization unit 1121 determines whether the combination of the organization ID, the user name, and the password included in the login request from the portal service application 1111 is stored as user information in the user information storage unit 1143 as illustrated in FIG. 6.

If the combination of the organization ID, the user name, and the password included in the login request from the portal service application 1111 is stored in the user information storage unit 1143, the process proceeds to step S85 where the authentication/authorization unit 1121 returns an authentication ticket to the portal service application 1111.

After the process of step S85, the portal service application 1111 may execute the process steps as illustrated in FIG. 14, for example. Because a SAML request is not included in the login request received in step S83 of FIG. 15, the portal service application 1111 generates a portal screen in step S64 of FIG. 14.

In step S86 of FIG. 15, the portal service application 1111 sends the portal screen to the browser 1014. In turn, the browser 1014 displays the portal screen including the app launcher 2030 as illustrated in FIG. 11.

The user may, for example, click the icon 2031 for the external service 1031 from the app launcher 2030 of the portal screen. In step S91, the browser 1014 accesses the external service 1031.

In steps S92 and S93, the browser 1014 is redirected to the URL set up as the login URL (sign-in page URL) by the single sign-on setting, and in turn, the browser 1014 sends a SAML federation request to the authentication/authorization unit 1121. Note that the SAML federation request sent in step S93 includes a SAML request, a RelayState, and an authentication ticket.

After the process of step S93, the authentication/authorization unit 1121 may execute the process steps as illustrated in FIG. 13, for example. Because an authentication ticket is included in the SAML federation request received in step S93, the authentication/authorization unit 1121 generates a SAML response in step S94. Note that the authentication/authorization unit 1121 generates a SAML response to a SAML request from the external service 1031 that belongs to the same trust circle associated with the same organization.

In steps S95 and S96, the authentication/authorization unit 1121 designates a POST destination of the external service 1031 to which the SAML response generated in step S94 is to be posted and prompts the browser 1014 to automatically POST the SAML response. In step S97, the external service 1031 checks the SAML response and prompts the browser 1014 to display a service screen for the corresponding user.

By implementing the process steps as illustrated in FIG. 15, when login via the login screen of the portal service application 1111 has already been performed, a SAML response may be returned to the browser 1014 in response to a SAML federation request without having the browser 1014 display a login screen.

Also, by implementing the process steps as illustrated in FIG. 15, a determination may be made as to whether a login request from the browser 1014 corresponds to a SAML request or a normal login request, and in the case where the login request corresponds to a normal login request, a portal screen may be returned.

<<Process Steps Upon Error>>

Figure 16:
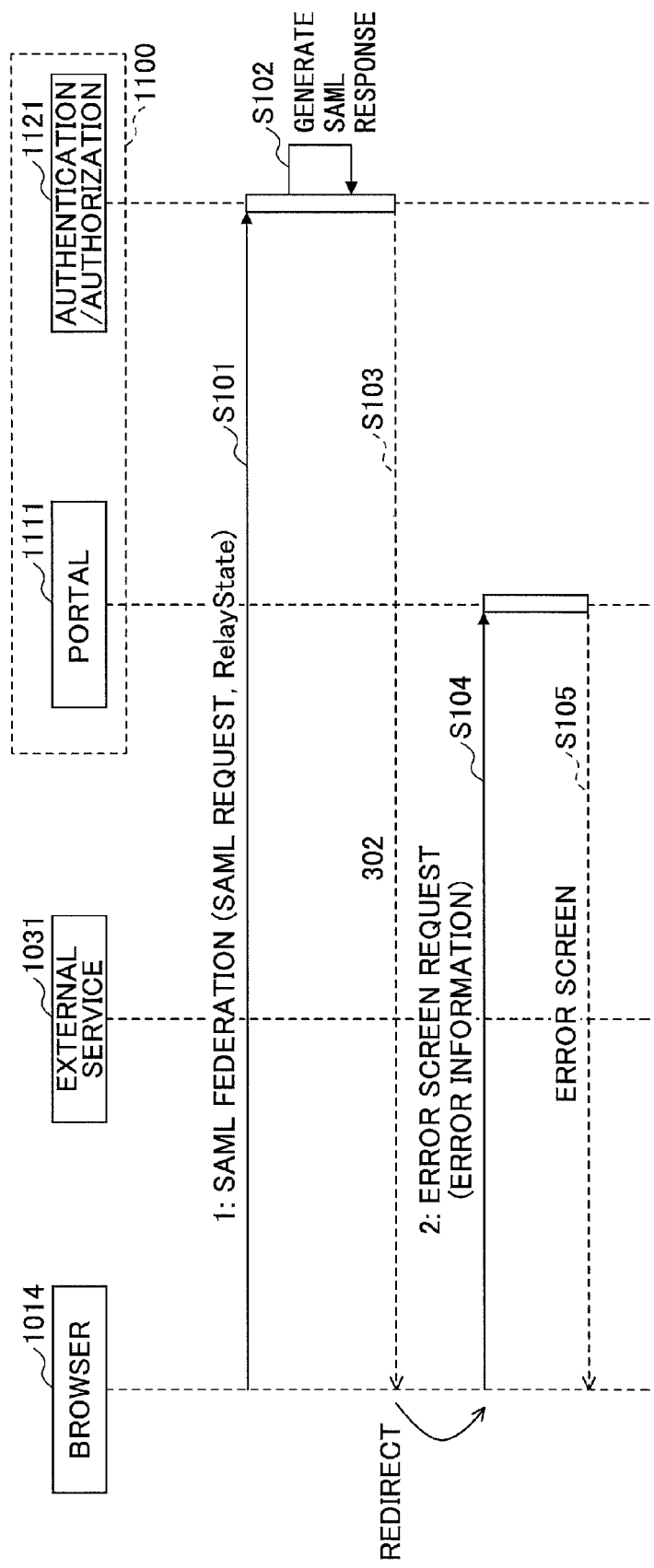
FIG. 16 is a sequence chart illustrating an exemplary sequence of process steps that may be executed when an error occurs.

FIG. 16 is a sequence chart illustrating exemplary process steps that may be executed when an error occurs. More specifically, FIG. 16 illustrates process steps that may be executed in an exemplary case where an error occurs in step S21 of FIG. 12 or in step S94 of FIG. 15.

In step S101, the browser 1014 is redirected to the SAML federation URL, and in turn, the browser 1014 sends a SAML federation request to the authentication/authorization unit 1121. Note that the SAML federation request sent in step S101 includes a SAML request, a RelayState, and an authentication ticket.

In step S102, it is assumed that an error occurs when the authentication/authorization unit 1121 generates a SAML response. For example, an error may occur when a SAML request that cannot be processed is received.

In steps S103 and S104, the browser 1014 is redirected to an error screen of the portal service application 1111, and in turn, the browser 1014 sends an error screen request to the portal service application 1111. The error screen request includes error information.

Figure 17:
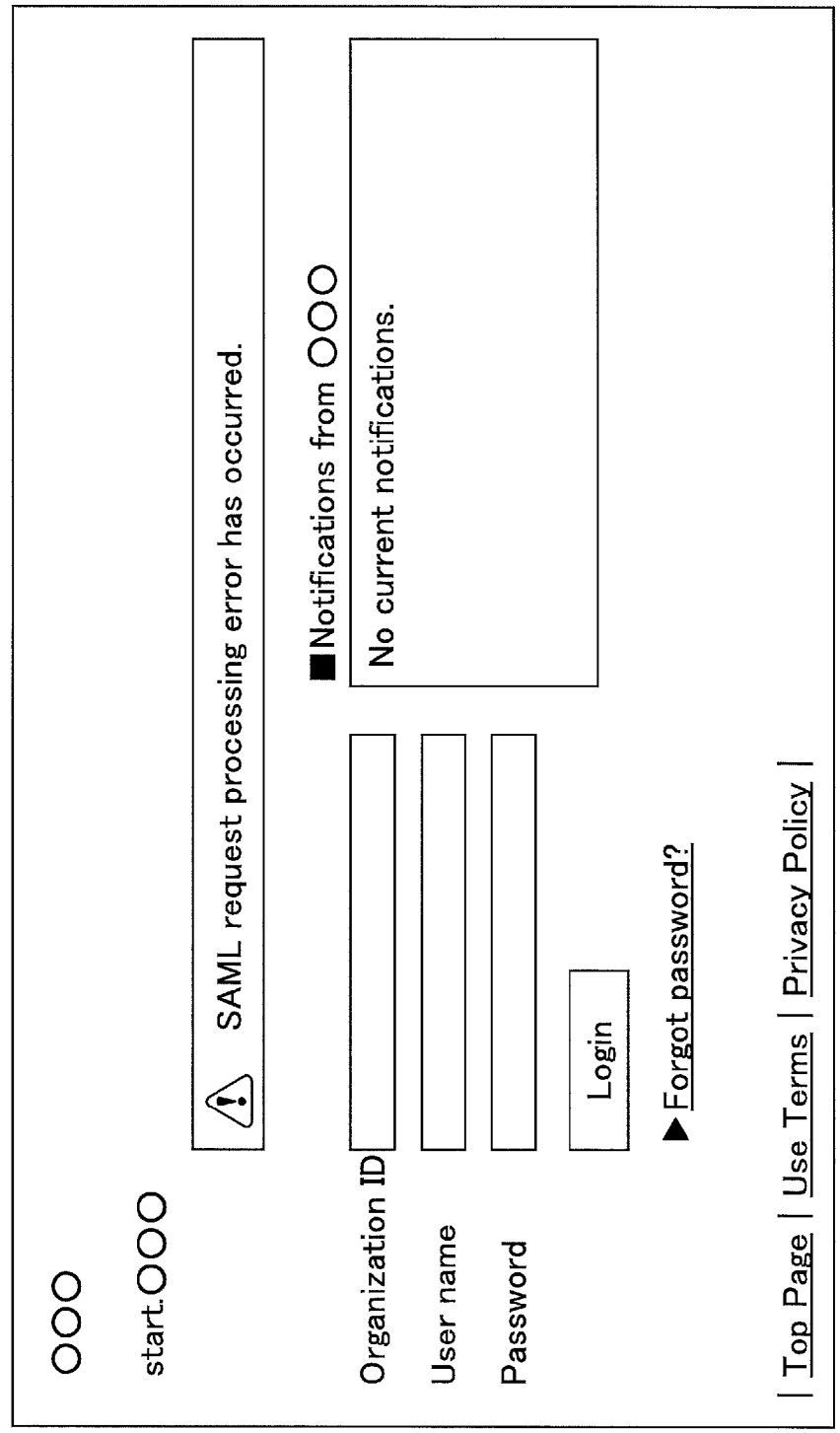
FIG. 17 is an image of an example of a login screen that displays error information.

In step S105, the portal service application 1111 sends an error screen to the browser 1014. In turn, the browser 1014 displays the error screen. The error screen may be a dedicated screen for displaying the error information or a login screen including the error information as illustrated in FIG. 17, for example.

<<App Launcher Screen 2030 of Portal Screen>>

The external service 1031 set up for single sign-on may be configured to separately provide a URL for accessing the external service 1031 through normal login operations (non-single sign-on) and a URL for accessing the external service 1031 through single sign-on (where the URL varies with respect to each organization ID). The app launcher screen 2030 of the external service 1031 that is configured to provide a URL for accessing the external service 1031 through non-single sign-on and a URL for accessing the external service 1031 through single sign-on may be generated in the following manner, for example.

In the app launcher screen 2030 illustrated in FIG. 11, a link for accessing the external service 1031 is represented by the icon 2031. When generating the app launcher screen 2030 including such a link for accessing the external service 1031, the portal service application 1111 checks whether the external service 1031 is set up for single sign-on and switches the URL of the link accordingly, for example.

Then, referring to the organization information as illustrated in FIG. 5, the portal service application 1111 checks whether there is a trust circle including the external service 1031 as a link. If such a trust circle exists, the portal service application 1111 uses the service provider URL included in the service provider information of the organization information as illustrated in FIG. 5. If such a trust circle does not exist, the portal service application 1111 uses a URL (fixed URL) for accessing the external service 1031 without using single sign-on.

As described above, when the service providing system 1100 is set up for single sign-on, the portal service application 1111 may switch a link included in the app launcher screen 2030 of the portal screen to a link to the URL of the external service 1031 that belongs to the same trust circle.

When generating the app launcher screen 2030 as illustrated in FIG. 11, a substantial amount of time may be required to search through the complicated data structure of the organization information stored in the organization information storage unit 1142 and acquire the service provider URL. In this respect, the service providing system 1000 of the first embodiment may reduce the amount of time required for displaying a page (URL page) by caching the service provider URL of the external service 1031 in a high-speed storage device. Examples of a high-speed storage device include Key-Value store and Memcached.

FIG. 18 is a flowchart illustrating exemplary process steps for caching the service provider URL in a high-speed storage device. Note that FIG. 18 illustrates process steps that may be executed after an ID of the service provider that is to be set up for single sign-on is entered into the screen as illustrated in FIG. 8.

In step S151, the organization managing unit 1122 acquires service provider information from the organization information (database) stored in the organization information storage unit 1142. In step S152, the organization managing unit 1122 updates service provider information cached in the high-speed storage device.

In step S153, the organization managing unit 1122 determines whether a service provider ID entered by an administrator (user) is equal to a service provider ID currently set up for single sign-on. If the service provider IDs are equal, the organization managing unit 122 ends the process of FIG. 18. On the other hand, when the service provider IDs are not equal, the organization managing unit 1122 deletes the trust circle associated with the organization in step S154. Then, in step S155, the organization managing unit 1122 determines whether an input value is empty.

If the input value is empty, the organization managing unit 1122 ends the process of FIG. 18. If the input value is not empty, the organization managing unit 1122 generates trust circle information of the organization information illustrated in FIG. 5 in step S156. Then, in step S157, the organization managing unit 1122 updates the service provider information cached in the high-speed storage device.

By implementing the process steps as illustrated in FIG. 18, service provider information may be cached in a high-speed storage device and the amount of time required for displaying a page (URL page) may be reduced. Also, in the case where the service provider information is already set up for single sign-on, the setting process may be omitted.

<<API Cooperation>>

In some cases, the external service 1031 may provide an API that may be used based on authentication by SAML federation. In such a case, when executing a job, a SAML request/SAML response may be generated and the SAML response may be posted to the ACS URL of the service provider included in the organization information of FIG. 5. In this way, login access to the external service 1031 may be obtained and the result may be used to execute the API.

FIG. 19 is a sequence chart illustrating exemplary process steps for enabling such API cooperation. More specifically, FIG. 19 illustrates exemplary process steps for enabling the service providing system 1100 to register a file of an image scanned by the image forming apparatus 1013 in the external service 1031. A user operates the image forming apparatus 1013 to send a login request to the service providing system 1100.

In step S201, the image forming apparatus 1013 logs into the authentication/authorization unit 1121 of the service providing system 1100. The image forming apparatus 1013 logs in using an organization ID, a user ID, and a password. If login is successful, the authentication/authorization unit 1121 returns an authentication ticket to the image forming apparatus 1013 in step S202.

In step S203, when the user requests the image forming apparatus 1013 to execute a job of registering a scanned image file in the external service 1031, the image forming apparatus 1013 scans an image. In step S204, the image forming apparatus 1013 attaches the authentication ticket to the scanned image file and uploads the scanned image file to the scan service application 1112.

In step S205, the scan service application 1122 attaches the authentication ticket to a login request for accessing the external service 1031 and sends the login request to the authentication/authorization unit 1121. Note that the service provider name of the external service 1031 may be used to designate the external service 1031 as the login destination in the login request.

In step S210, the authentication/authorization unit 1121 returns a SP authentication ticket of the external service 1031 to the scan service application 1112. Then, in step S211, the scan service application 1112 attaches the SP authentication ticket of the external service 1031 to the file and registers the file in the external service 1031. In step S212, the external service 1031 returns a file registration result to the scan service application 1122. In step S213, the image forming apparatus 1013 receives the file registration result from the scan service application 1112.

SUMMARY

In the service providing system 1100 according to the first embodiment, a trust circle may be set up with respect to each organization, and in this way, SAML-based single sign-on accommodating a plurality of organizations may be implemented. Accordingly, flexibility may be enhanced in setting a trust relationship for authentication in the information processing system 1000 according to the first embodiment.

Further, the present invention is not limited to the specific embodiments described herein, and variations and modifications may be made without departing from the spirit and scope of the present invention.

Note that the portal service application 1111 described above corresponds to an exemplary embodiment of a receiving unit. The authentication/authorization unit 1121 corresponds to an exemplary embodiment of an authentication unit. The office device having the browser 1014 installed therein corresponds to an exemplary embodiment of an external device. The user information storage unit 1143 corresponds to an exemplary embodiment of a first storage unit. The organization information storage unit 1142 corresponds to an exemplary embodiment of a second storage unit.

Further, the SAML request and the SAML response described above correspond to exemplary embodiments of a federated authentication request and a federated authentication response. The authentication ticket corresponds to an exemplary embodiment of authentication information indicating that authentication has been completed. The portal screen corresponds to an exemplary embodiment of a screen including information on the external service that can be accessed. The user name corresponds to an exemplary embodiment of user identification information. The organization ID corresponds to an exemplary embodiment of organization identification information. The application 1101 corresponds to an exemplary embodiment of an internal service.

The present application is based on and claims the benefit of priority of Japanese Patent Application No. 2013-021264, filed on Feb. 6, 2013, the entire contents of which are hereby incorporated herein by reference.

What is claimed is:

1. An information processing system, comprising:
one or more information processing devices,
wherein the one or more information processing devices includes:
a storage unit configured to store a program; and
a processor configured to execute the program,
wherein the program which, when executed by the processor, functions as:
a receiving unit configured to receive user identification information and organization identification information from an external device; and
an authentication unit configured to perform authentication with respect to the user identification information and the organization identification information received from the external device by the receiving unit using a first storage unit that stores one or more sets of user identification information in association with the organization identification information;
wherein when the authentication unit receives a federated authentication request to access an external service from the external device that is authenticated, the authentication unit sends a federated authentication response to the external device if the organization identification information received from the external device and the external service designated in the federated authentication request are stored in association with each other in a second storage unit that stores the organization identification information in association with information on one or more external services that have established a trust relationship for authentication;
wherein when the authentication unit receives the federated authentication request from the external device that is not authenticated, the authentication unit attaches information on the federated authentication request to a response to the receiving unit for prompting the receiving unit to receive the user identification information and the organization identification information from the external device;
wherein when the information on the federated authentication request is attached to the user identification information and the organization identification information received from the external device, the receiving unit sends authentication information indicating authentication has been completed by the authentication unit to the external device; and
wherein when the authentication unit receives from the external device the federated authentication request that has the authentication information attached thereto, the authentication unit determines that the federated authentication request is from the external device that is authenticated.

2. The information processing system according to claim 1, wherein when the information on the federated authentication request is not attached to the user identification information and the organization identification information received from the external device, the receiving unit prompts the external device to display a screen including information on the external service that can be accessed.

3. The information processing system according to claim 1, wherein when an error occurs in generating the federated authentication response, the authentication unit sends a request to the receiving unit to prompt the external device to display a screen including error information.

4. The information processing system according to claim 2, wherein when the external service separately provides an access destination for the external device with which the trust relationship for authentication is established and an access destination for the external device with which the trust relationship for authentication is not established, the receiving unit switches access destination information of the external service in the screen including the information on the external service that can be accessed based on the second storage unit.

5. The information processing system according to claim 2, further comprising:
a third storage unit from which information may be retrieved at a faster rate than the second storage unit, the third storage unit storing the information on the external service that can be accessed;
wherein the receiving unit generates the screen including the information on the external service that can be accessed based on the information on the external service retrieved from the third storage unit.

6. The information processing system according to claim 1, wherein when the authentication unit receives a login request to access the external service from an internal service that has received a process request from the external device that is authenticated, if the organization identification information received from the external device and the external service designated in the login request are stored in association with each other in the second storage unit, the authentication unit provides to the internal service authentication information of the external service acquired by sending the federated authentication response to the external service, and prompts the internal service to execute a process based on the process request using the external service.

7. An information processing device comprising:
a storage unit configured to store a program; and
a processor configured to execute the program,
wherein the program which, when executed by the processor, functions as:
a receiving unit configured to receive user identification information and organization identification information from an external device; and
an authentication unit configured to perform authentication with respect to the user identification information and the organization identification information received from the external device by the receiving unit using a first storage unit that stores one or more sets of user identification information in association with the organization identification information;
wherein when the authentication unit receives a federated authentication request to access an external service from the external device that is authenticated, the authentication unit sends a federated authentication response to the external device if the organization identification information received from the external device and the external service designated in the federated authentication request are stored in association with each other in a second storage unit that stores the organization identification information in association with information on one or more external services that have established a trust relationship for authentication;
wherein when the authentication unit receives the federated authentication request from the external device that is not authenticated, the authentication unit attaches information on the federated authentication request to a response to the receiving unit for prompting the receiving unit to receive the user identification information and the organization identification information from the external device;

wherein when the information on the federated authentication request is attached to the user identification information and the organization identification information received from the external device, the receiving unit sends authentication information indicating authentication has been completed by the authentication unit to the external device; and wherein when the authentication unit receives from the external device the federated authentication request that has the authentication information attached thereto, the authentication unit determines that the federated authentication request is from the external device that is authenticated.

8. An authentication method executed by an information processing system including one or more information processing devices, the authentication method comprising:

a receiving step in which a receiving unit receives user identification information and organization identification information from an external device;

an authentication step in which a processor performs authentication with respect to the user identification information and the organization identification information received from the external device by the receiving unit using a first memory that stores one or more sets of user identification information in association with the organization identification information;

a request receiving step in which the processor receives a federated authentication request to access an external service from the external device that is authenticated;

a sending step in which the processor sends a federated authentication response to the external device if the organization identification information received from the external device and the external service designated in the federated authentication request are stored in association with each other in a second memory that stores the organization identification information in association with information on one or more external services that have established a trust relationship for authentication;

an attaching step in which when the processor receives the federated authentication request from the external device that is not authenticated, the processor attaches information on the federated authentication request to a response to the receiving unit for prompting the receiving unit to receive the user identification information and the organization identification information from the external device;

a sending step in which when the information on the federated authentication request is attached to the user identification information and the organization identification information received from the external device, the receiving unit sends authentication information indicating authentication has been completed by the processor to the external device; and a determining step in which when the processor receives from the external device the federated authentication request that has the authentication information attached thereto, the processor determines that the federated authentication request is from the external device that is authenticated.

* * * * *